Nov. 20, 1923.
W. H. TAYLOR, 3D
FLEXIBLE PIPE JOINT
Filed June 19, 1922
1,475,090
2 Sheets-Sheet 2
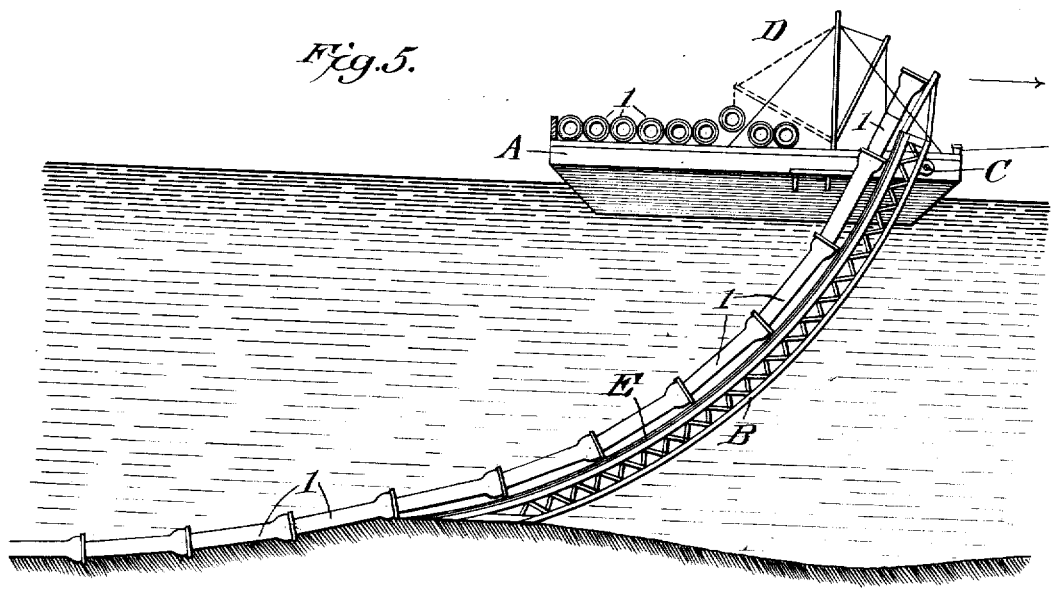
Fig.5.
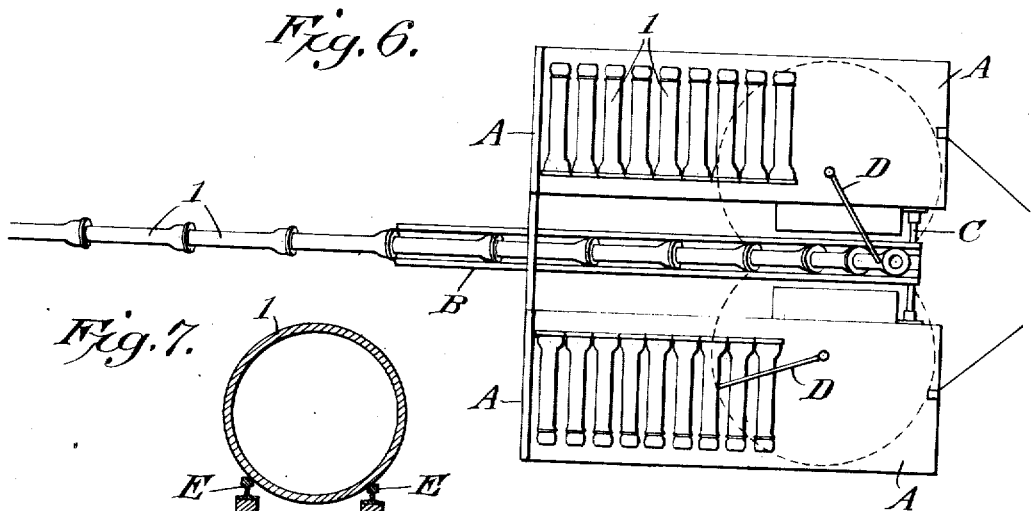
Fig.6.
Fig.7.
WITNESSES
Walter H. Taylor, III, INVENTOR,
BY
ATTORNEY Patented Nov. 20, 1923.

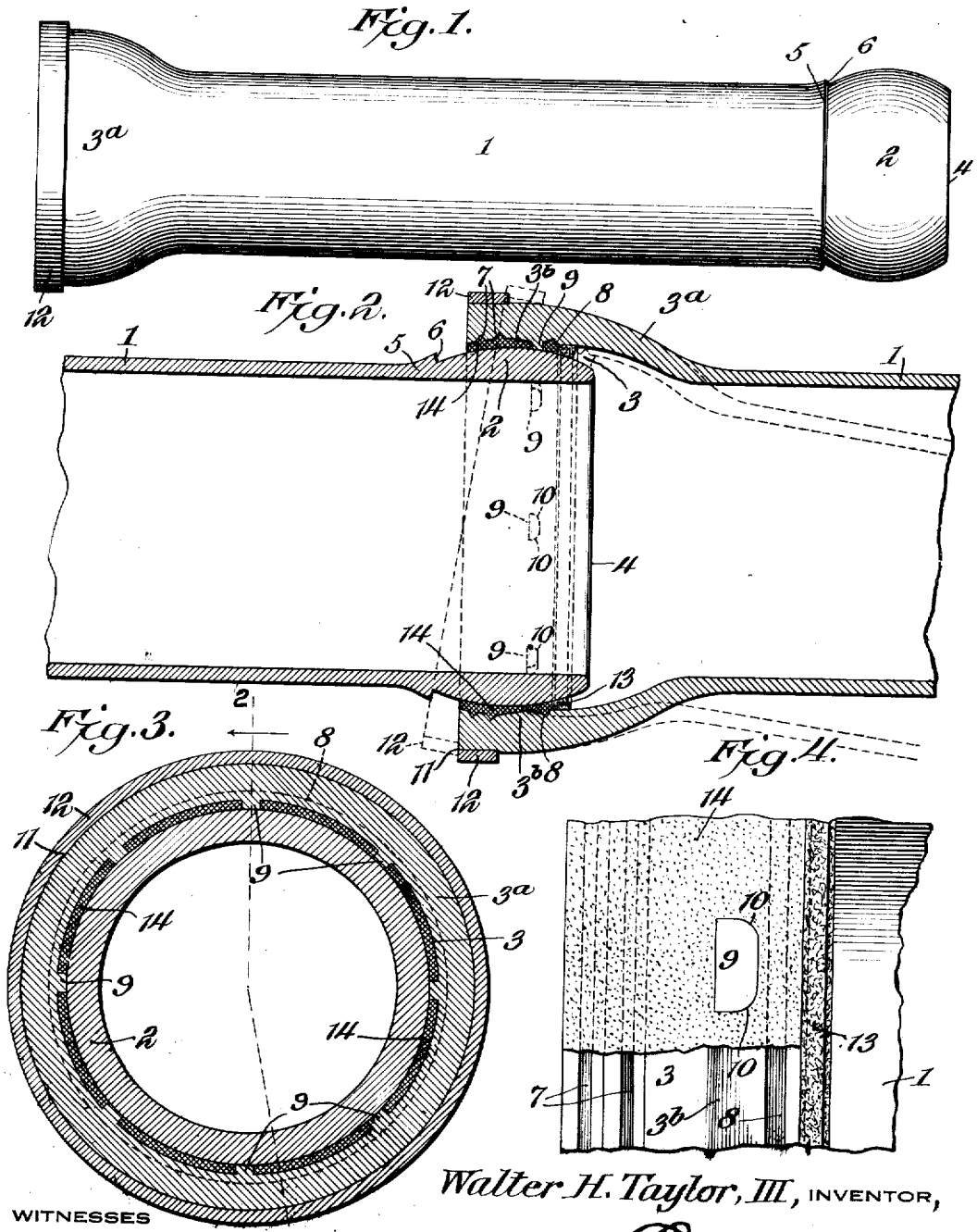

1,475,090

UNITED STATES PATENT OFFICE.

WALTER HERRON TAYLOR, 3D, OF NORFOLK, VIRGINIA, ASSIGNOR TO LYNCHBURG FOUNDRY COMPANY, OF LYNCHBURG, VIRGINIA, A CORPORATION OF VIRGINIA.

FLEXIBLE PIPE JOINT.

Application filed June 19, 1922. Serial No. 569,215.

*To all whom it may concern:*

Be it known that I, WALTER H. TAYLOR, 3d, a citizen of the United States, residing at Norfolk, in the county of Norfolk and State of Virginia, have invented new and useful Improvements in Flexible Pipe Joints, of which the following is a specification.

This invention relates to flexible pipe joints of the ball and socket type to be used especially in connection with cast iron pipes.

The object is to provide a joint for pipes of this character, and particularly pipes of the larger diameters, whereby the pipe, when joined, may rest upon an uneven bed without the possibility of leakage or impairing the joint, the ball and socket feature permitting adjacent pipe sections to assume different angles with respect to each other in order to adjust themselves to the uneven supporting surface found at the bottoms of rivers, creeks, harbors, etc., when it is found necessary to carry the pipe line through, into or across bodies of water.
Another object is to provide a flexible joint for cast iron pipes having ball and socket ends which are cast integrally with the pipe, the ball being formed at the spigot end of a pipe section and the socket constituting what is termed the bell end of the same section of pipe, the meeting faces of the ball and socket being afterward machined at the foundry to provide true spherical bearing surfaces, which are fitted so that the ball of one section is engaged in the socket of the next section of pipe.

A final and most important object of the invention is to provide a cast iron pipe having flexible joints consisting of ball and socket members, which may be interfitted quickly and accurately to center the ball of one section into the socket of the next adjacent section, the longitudinal axes of the sections being in perfect alinement, the ball being prevented from entering the socket too far, or too little, by certain spacing means in the form of integrally cast lugs within the socket, so that in pouring the lead it may pass beyond the said lugs, thus forming a continuous ring or sheet around the spigot, and rigidly held from any movement within the bell, the lead being free to be finally calked from the interior of the pipe after the latter has assumed its final position upon the bed or bottom of the body of water.

A full and complete understanding of the invention may be obtained from a consideration of the following detailed description taken in connection with the accompanying drawings forming a part of this specification, it being understood that while the drawings show a practical form of the invention, the latter is not confined to strict conformity with the showing thereof, but may be changed or modified, so long as such changes or modifications mark no material departure from the salient features of the invention, as specifically pointed out in the appended claims.

In the drawings, in which similar reference characters designate corresponding parts throughout the several figures:

Figure 1 is a side elevation of the improved pipe;

Figure 2 is a longitudinal sectional view through the joint drawn on a larger scale, and taken on the line 2—2 of Figure 3;

Figure 3 is a transverse sectional view through the jointed bell and spigot;

Figure 4 is a detail showing on an enlarged scale one of the ball-centering lugs and the grooves for the lead packing;

Figure 5 is a view in elevation illustrating the manner of laying the pipes for subaqueous or submarine use;

Figure 6 is a plan view of the subject matter of Figure 5;

Figure 7 is an enlarged cross sectional view showing the manner of supporting the pipe while gravitating to the bottom of the river or other body of water.

It has been found impossible to maintain a pipe line beneath the surface of bodies of water, where the joints of such pipe sections were of the common rigid type, for the reason that the beds or bottoms of bays, rivers, creeks, etc., are more or less uneven, thus subjecting some of the joints to undue strain where bridging a hollow or elevation in the bottom, and causing the joints to open or move and bringing about a leaky condition. It has been proposed to use the ball and socket type of joint but where only the ordinary outside calking at the face of the bell is relied upon to maintain a tight joint, this has proven to be inadequate, because the calking must necessarily be done above the surface of the water, after which the pipes are lowered into the water and, upon reaching the bottom, they are forced to assume different angular relations to each other, causing the lead calking to become compressed at one point or another and opening up the seam or joint to permit the seepage of water therethrough.

It has been found by practical experience that with the use of the ball and socket type of joint, a final calking of the lead from the interior of the pipe, after the same has found its final resting place upon the bottom, is necessary, and it is with the provision of means for accomplishing the second or final calking from the inside of the pipe that the present invention is concerned.

In carrying out this invention, the pipe may be formed of different diameters, through the usual processes employed in pipe foundries, as the invention is applicable to any size pipe capable of accommodating a man to enter or pass therethrough to do the final calking from the interior.

The pipe 1 is of any desired length and is formed with a ball 2 at one end constituting what is commonly known as the spigot end of the pipe, and the other end of the same is provided with a socket 3, this end being known as the bell end of the pipe.

The ball 2, as viewed from the side, constitutes a portion of a sphere, with the outer or open end 4 of the pipe covering or dividing the sphere perpendicularly to the axis of the pipe, and at a point substantially midway between the center and the circumference of the sphere. The inner line of the ball is defined by a circumferential flange or shoulder 5 cast integrally with the pipe, and having its outer face 6, or that directed towards said ball, arranged at an angle coinciding with the center of said ball, as clearly shown in Figure 2 of the drawing. The inner line or margin of the ball 2, as defined by said flange or shoulder, is also located at substantially the same distance from the center of the ball as the outer or open end 4.

The bell end of the pipe having the socket 3 therein is formed with the interior wall of the socket conforming generally to the contour of the exteriorly flared end portion 3ª, except that the walls gradually thicken towards the open end of the bell, to provide for the required strength of material at this point. The usual annular lead grooves 7 are formed in the casting operation in close proximity to the open end of the socket 3, and part of the inside wall of the socket 3 is cast in spherical shape, the curvature of which is formed on a radius somewhat greater than the radius of the ball at the other end of the pipe section, so that when the ball of one section is placed into the bell end of another section, an annular lead space of varying thickness is provided entirely around the said ball, said space being slightly thinner throughout the center one-third than throughout the inside or outside thirds of the length thereof.

The varying thickness of said space is produced by providing a slightly depressed portion, at the center of the socket 3, as indicated at 3ᵇ, which, after the lead is poured in a manner to be explained, serves as a lock to prevent the latter from moving within the socket, when the joint is under strain, and the inner portion of said depression also serves to create the desired wedging effect on an inner flexible or collapsible lead stop used in the operation of forming the joint and to be described later. The inner portion of the interior of the bell end may be curved in any desired manner to merge into the line of the interior of the pipe proper, and to provide a gradually decreasing space between the same and the surface of the ball.

At the inner margin of the spherical socket 3, an additional lead groove 8 is formed which extends entirely around the interior of the bell in spaced relation to the first named pair of grooves (Figure 4), and at the edge of said groove 8 nearest to the open end of the bell, a series of lugs 9 are cast integrally with the same, said lugs being equally spaced apart and somewhat longer than wide circumferentially of the pipe. The inner corners of the lugs 9 are rounded, as illustrated at 10 in Figure 4 of the drawing for a purpose to be explained. These lugs, the number of which depends upon the size of the pipe, extend inwardly toward the center of the spherical socket wall, and are adapted to bear on the ball 2 of the adjacent pipe when in place, and since the lugs are located within the bell in line with a point beyond the center of the sphere, it follows that the inner walls of the lugs are arranged closer to the longitudinal axis of the pipe than the outer walls thereof, so that when the ball of the next pipe is introduced therein, it is prevented from entering the bell too far, and perfect alinement of the longitudinal axes of the two pipes is secured and maintained, and the center of the ball coincides exactly with the center of the spherical socket.

In addition, the lugs provide for self-alinement of the ball end of one pipe with the socket end of the other, spacing the ball from the socket, and providing for a uniform space for the lead packing. They constitute an important part of this invention. While they are shown as formed on the socket, they might be provided on the ball end of the pipe in which case the socket end would be machined spherically, though the illustrated plan is the better.

The open end of the flared bell 3ª on the outside is provided with an annular channel 11 of very slight depth, into which is shrunk a steel ring 12 which, by contraction, is securely held thereon, for the purpose of strengthening the mouth of the bell end of the pipe.

After the pipe is cast by any approved method to produce the above described features, the same is placed in a lathe, and the interior lugs of the spherical socket 3 are turned true to a certain radius. The ball 2 is likewise turned true to predetermined radius, to provide a proper space between the two for the reception of the lead packing, and in a similar manner the exterior channel 11 is turned true, as well as the interior of the steel ring 12. After these operations. the ring is shrunk onto the outside of the ball by any approved method and the pipe is ready for use.

In laying the pipe disclosed herein, a quantity of pipe is placed aboard scows A or other vessels, which may support between them a pivoted curved cradle B, and the same towed to the scene of operations (Figs. 5, 6 and 7).

The cradle B which is formed of some suitable strong, light construction, suitably trussed, etc., is pivoted to the spaced scows A, as at C, and is allowed to drag along with its lower end bearing on the bed of the river, the arc of the circle on which the cradle is formed depending on the maximum deflection of the pipe, taking into consideration the depth of the water to be operated in.

Assuming that a number of pipes have already been laid or connected and allowed to gravitate down the cradle to a seat on the bottom of the river, another length or section of pipe is picked up by suitable hoisting means D on the scows, and placed at the top of the cradle in an angular position, as shown in Figure 5 of the drawing, though in perfect longitudinal alinement with the section of pipe beneath, with the centers of the ball and socket coinciding. After a suitable lead stop (not shown) in the form of the usual ring is applied to the uppermost pipe in proper position around the same to hold the lead, and a flexible or collapsible lead stop 13, ring or abutment formed of any of the usual fibrous non-inflammable materials, is temporarily wedged into the tapering interior space between the end of the ball and the inner depressed portion of the socket, the lead is poured.

The lead finds its way into the grooves 7, and between and around the lugs 9 until it reaches the inner lead stop or abutment 13, whose adjacent edge is about flush with the inner edge of the inner lead groove 8, into which the lead also flows at the inner margin of the latter, and it will be noted that the rounded corners 10 of the lugs facilitate the flow of the lead around the lugs to permit a solid formation of lead around the series of lugs, the lugs serving as additional anchoring means for the lead. The stop or abutment 13 prevents the molten lead when poured in from passing beyond the same. It is as the name implies a lead stop.

The lead stop or abutment 13 may either be placed into the bell end of the pipe before another pipe is placed in position, or afterward as described, for it is to be remembered that the pipes in question are large enough for the entrance of a man.

When the lead is cooled, the lead stop or abutment 13 is removed, and the outer end of the lead sheet which has been poured flush with the face of the bell end, is then calked to compact the lead into the grooves 7. The newly applied or jointed pipe is then moved laterally to free the ball 2 within the confining ring of lead so that the two pipe sections may be deflected to the maximum, or until the face of the bell end strikes the inclined face 6 of the annular shoulder 5. This freeing or breaking of the joint may not unduly strain the same, or cause any openings or leaks, and the newly applied section of pipe is allowed to gravitate downwardly in the cradle, the latter being provided with suitable rails E for supporting the line of pipes, and the latter finds its resting place on the bottom of the river.

In addition to the two usual annular grooves 7 near the face of the bell, the third groove 8 has been provided, beyond the lugs and further into the mouth of the bell, for the reception of the lead and into this groove the lead is finally compressed after the pipe is seated on the bottom of the river by a man who enters the pipe line and follows the succeeding pipe sections as they come to rest on the bottom. In addition to the anchorage of the lead by the lugs, the eccentric spherical surface produces an absolute lock of the lead packing in place.

This provision of calking the joint from the inside is a very essential feature of this invention. If there should be a leakage at the other end of the lead packing, the calking of the lead from the inside of the pipe would close the joint and make it absolutely water-tight. When the lead stop or abutment 13 is removed, it exposes the inner ends of the lead packing, and there is room enough between the end of the ball and the socket in which a workman may insert a proper tool and by the use of a hammer calk the lead forcing it more firmly into the groove 8 and against the lugs 9. Practical tests have shown that this is an effective means for producing a water-tight flexible joint for pipes used in submarine or subaqueous work.

At the maximum deflection of the pipe, the shoulder 6 provides a definite stop to contact with the outer edge of the lead packing, and thus prevent injuring the lead at the face of the bell and eliminates all undesirable strains on the lower surface of the lead where the spigot end rests thereon.

From the foregoing it will be seen that a simple, effective and cheaply manufactured flexible joint for cast iron pipes, for subaqueous use, has been provided which may, by means of some such outfit as has been shown and described, be easily and quickly joined together and remain indefinitely in use.

What is claimed is:—

1. In a flexible pipe joint, pipes each having a ball on one end and socket on the other, the socket of one pipe receiving the ball of the next adjacent pipe, with a space between the ball and socket, one of the elements being provided with a plurality of spaced lugs located at one side of the vertical center of the ball end and bearing against the other element, and lead packing filling the space between the ball and socket and between and around said lugs, whereby one pipe may be locked relatively to the other pipe after the joint has been packed without affecting the joint.

2. In a flexible pipe joint, pipes each having a ball at one end and socket at the other, the ball end of one pipe being inserted within the socket of the adjacent pipe with a space between the ball and socket, a plurality of lugs spaced apart and extending inwardly from the interior of the socket, so as to engage the ball at spaced points and form a bearing for the ball end and lead packing filling the space between the ball and socket and also between and around said lugs, whereby one pipe may be rocked relatively to the other pipe after the joint has been packed without affecting the joint.

3. In a flexible pipe joint, pipes each having a ball at one end and a socket at the other, the ball end of one pipe being inserted within the socket of the adjacent pipe, with a space between the ball and socket, a plurality of lugs extending inwardly from the interior of the socket of one pipe and adapted to bear upon the ball of the other pipe at one side of the vertical center of the ball, said lugs forming a bearing for the ball as well as a stop to limit the insertion of the ball end into the socket and lead packing filling the space between the ball and socket and also filling the spaces between the lugs, whereby one pipe may be rocked relatively to the other pipe after the joint has been packed without affecting the joint.

4. In a flexible pipe joint, pipes each having a ball at one end and a socket at the other, the ball end of one pipe being inserted within the socket end of the adjacent pipe leaving an annular space between the ball and socket, a plurality of spaced lugs provided on the interior of the socket of one pipe and adapted to contact with the ball on the adjacent pipe at a point on the ball nearer to the vertical center of the ball than to the outer end thereof, said lugs spacing the ball from the socket and preventing the insertion of the ball too far into the socket, and lead packing filling the space between the ball and socket and also filling the spaces between the lugs and completely enclosing the latter so that they provide anchoring means for the packing, whereby one pipe may be rocked relatively to the other pipe after the joint has been packed without affecting the joint.

5. In a flexible pipe joint, pipes each having a ball on one end and a socket on the other, the socket of one pipe being adapted to receive the ball of the adjacent pipe leaving an annular space between the ball and socket, a plurality of lugs extending from one element and engaging the other element, and spaced from each other, so as to space the ball from the socket and form a bearing for said other element, said lugs being longer than wide circumferentially of the pipe, and a lead packing poured into the space between the ball and socket and also filling the spaces between the said lugs and completely enclosing the latter, whereby one pipe may be rocked relatively to the other pipe after the joint has been packed without affecting the joint.

6. In a flexible pipe joint, pipes each having a ball at one end and a socket on the other, the ball of one pipe being adapted to be inserted into the socket of the adjacent pipe leaving a space between the ball and socket, a plurality of spaced lugs projecting inwardly from the socket of one pipe and adapted to contact with the ball of the adjacent pipe and form a bearing for the ball, a plurality of annular grooves provided in the socket between the lugs and the outer end of the socket, and a lead packing poured into the space between the ball and the socket and filling said space, as well as said grooves and the spaces between the said lugs, whereby one pipe may be rocked relatively to the other pipe after the joint has been packed without affecting the joint.

7. In a flexible pipe joint, pipes each having a ball at one end and a socket at the other, the pipes being fitted together so that the ball of one pipe is inserted within the socket of the adjacent pipe, leaving a space between the ball and socket, a plurality of lugs extending inwardly from the interior of the socket of one pipe and adapted to contact with the outer face of the ball of the adjacent pipe, and form a bearing for the ball, said lugs being spaced apart circumferentially of the pipe and serving to space the ball from the socket and limit the insertion of the ball within the socket, said socket being provided with an annular groove alongside the said lugs, and a lead packing poured into the space between the ball and the socket and filling said space and extending through the spaces between the lugs and filling the said groove, whereby one pipe may be rocked relatively to the other pipe after the joint has been packed without affecting the joint.

8. In a flexible pipe joint, pipes each having a ball at one end and a socket at the other, the pipes being fitted together so that the ball of one pipe is inserted within the socket of the adjacent pipe leaving a space between the ball and socket, a plurality of lugs extending inwardly from the interior of the socket of one pipe and adapted to contact with the outer face of the ball of the adjacent pipe and form a bearing for the ball, said lugs being spaced apart circumferentially of the pipe and serving to space the ball from the socket and limit the insertion of the ball within the socket, said socket being provided with interior grooves between the said lugs and the outer end of the socket and a single groove alongside the said lugs, and a lead packing poured into the space between the ball and socket and filling the said grooves and completely enclosing the said lugs, whereby one pipe may be rocked relatively to the other pipe after the joint has been packed without affecting the joint.

9. In a flexible joint, pipes each having a ball at one end and a socket at the other, the ball end of one pipe being insertible into the socket of an adjacent pipe with a space between the ball and socket, the walls of said socket approaching the surface of the ball closer at the central portion than the ends to provide an inner wedging space for an interior lead stop, a plurality of radially disposed lugs formed on one of the elements and engaging the other element at spaced points and forming a bearing for said other element and lead packing filling the space between the ball and socket and between and around the lugs, whereby one pipe may be rocked relatively to the other pipe after the joint has been packed without affecting the joint.

In testimony that I claim the foregoing as my own, I have hereto affixed my signature.

WALTER HERRON TAYLOR, III.

Certificate of Correction.

It is hereby certified that in Letters Patent No. 1,475,090, granted November 20, 1923, upon the application of Walter Herron Taylor, 3d, of Norfolk, Virginia, for an improvement in "Flexible Pipe Joints," an error appears in the printed specification requiring correction as follows: Page 4, line 26, claim 1, for the word "locked" read *rocked;* and that the said Letters Patent should be read with this correction therein that the same may conform to the record of the case in the Patent Office.

Signed and sealed this 22d day of January, A. D., 1924.

[SEAL.]

KARL FENNING,
*Acting Commissioner of Patents.*